US010462519B2

United States Patent
Drake et al.

(10) Patent No.: US 10,462,519 B2
(45) Date of Patent: Oct. 29, 2019

(54) GENERATING DYNAMIC TEMPORAL VERSIONS OF CONTENT

(71) Applicant: Disney Enterprises, Inc., Burbank, CA (US)

(72) Inventors: Edward Drake, Stevenson Ranch, CA (US); Andrew J. Wright, South Pasadena, CA (US); Letisha Shaw, Sherman Oaks, CA (US); Alexander C. Chen, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/848,101

(22) Filed: Sep. 8, 2015

(65) Prior Publication Data

US 2016/0373817 A1 Dec. 22, 2016

Related U.S. Application Data

(60) Provisional application No. 62/182,329, filed on Jun. 19, 2015.

(51) Int. Cl.
*H04N 21/8549* (2011.01)
*H04N 21/4402* (2011.01)
(Continued)

(52) U.S. Cl.
CPC ..... *H04N 21/44029* (2013.01); *G11B 27/031* (2013.01); *H04N 21/23109* (2013.01);
(Continued)

(58) Field of Classification Search
CPC ......... H04N 21/44029; H04N 21/8541; H04N 21/8549; H04N 21/23109; H04N 21/251;
(Continued)

(56) References Cited

U.S. PATENT DOCUMENTS 6,052,492 A 4/2000 Bruckhaus
6,278,446 B1 8/2001 Liou et al.
(Continued)

FOREIGN PATENT DOCUMENTS

CN 102883194 A 1/2013

OTHER PUBLICATIONS

Brown, Lisa; Split Your Video into Sub Clips with Auto Scene Detection, http://www.wondershare.com/video-editing-tips/detect-scene.html, accessed on Jun. 9, 2015, pp. 1-9.
(Continued)

*Primary Examiner* — Pankaj Kumar
*Assistant Examiner* — Alexander Boyd
(74) *Attorney, Agent, or Firm* — Sheppard Mullin Richter & Hampton LLP

(57) ABSTRACT

Systems and methods for dynamically and automatically generating short-form versions of long-form media content are provided. The long-form media content may be tagged with metadata indicating objects or actions in frames, scenes, portions of scenes, or other units of the media content. The systems and methods may receive a user-specified time limit and use the metadata to create a short-form version of the long-form media content (using one or more of the scenes, portions of scenes, or other units of the media content), which preserves one or more story arcs within the media content.

18 Claims, 7 Drawing Sheets

(51) Int. Cl.
  *H04N 21/262* (2011.01)
  *G11B 27/031* (2006.01)
  *H04N 21/258* (2011.01)
  *H04N 21/45* (2011.01)
  *H04N 21/25* (2011.01)
  *H04N 21/466* (2011.01)
  *H04N 21/231* (2011.01)
  *H04N 21/845* (2011.01)
  *H04N 21/414* (2011.01)
  *H04N 21/482* (2011.01)

(52) U.S. Cl.
  CPC ..... *H04N 21/251* (2013.01); *H04N 21/25891* (2013.01); *H04N 21/262* (2013.01); *H04N 21/26258* (2013.01); *H04N 21/41407* (2013.01); *H04N 21/4532* (2013.01); *H04N 21/4667* (2013.01); *H04N 21/4826* (2013.01); *H04N 21/8456* (2013.01); *H04N 21/8549* (2013.01)

(58) Field of Classification Search
  CPC ........... H04N 21/25891; H04N 21/262; H04N 21/26258; H04N 21/4532; H04N 21/4667; H04N 21/8456
  See application file for complete search history.

(56) References Cited

U.S. PATENT DOCUMENTS

| | | | |
|---|---|---|---|
| 6,751,776 B1* | 6/2004 | Gong | G06F 17/30616 707/E17.028 |
| 6,807,362 B1 | 10/2004 | Girgensohn et al. | |
| 7,127,120 B2 | 10/2006 | Hua et al. | |
| 7,248,778 B1 | 7/2007 | Anderson et al. | |
| 8,238,672 B2 | 8/2012 | Choi et al. | |
| 8,442,384 B2 | 5/2013 | Bronstein et al. | |
| 8,606,083 B2 | 12/2013 | Girgensohn et al. | |
| 8,643,746 B2 | 2/2014 | Karn et al. | |
| 8,676,024 B2 | 3/2014 | Nakate et al. | |
| 9,332,285 B1* | 5/2016 | Grant | H04N 21/23439 |
| 10,055,494 B1* | 8/2018 | Bordenet | H04N 21/8541 |
| 2003/0061610 A1* | 3/2003 | Errico | H04N 21/8549 725/46 |
| 2003/0093790 A1* | 5/2003 | Logan | H04N 21/26258 725/38 |
| 2007/0047917 A1* | 3/2007 | Sasaki | H04N 5/783 386/230 |
| 2009/0100454 A1* | 4/2009 | Weber | G11B 27/28 725/9 |
| 2009/0119704 A1* | 5/2009 | Dimitrova | H04N 21/8456 725/38 |
| 2010/0091113 A1* | 4/2010 | Morioka | H04N 5/147 348/207.1 |
| 2010/0153856 A1* | 6/2010 | Russ | H04N 21/23439 715/753 |
| 2010/0281383 A1* | 11/2010 | Meaney | G11B 27/34 715/723 |
| 2010/0287475 A1* | 11/2010 | van Zwol | G06F 3/04817 715/723 |
| 2012/0123780 A1* | 5/2012 | Gao | H04N 21/44029 704/245 |
| 2016/0316280 A1* | 10/2016 | Bulley | H04N 21/251 |

OTHER PUBLICATIONS

Alvarez, Llyod, Magnum—The Edit Detector, http://aescripts.com/magnum-the-edit-detector/, accessed on Jun. 9, 2015, pp. 1-3.
First Office Action and Search Report in Chinese Patent Application No. 2016104448105, dated Sep. 10, 2018.

* cited by examiner

GENERATING DYNAMIC TEMPORAL VERSIONS OF CONTENT

TECHNICAL FIELD

The present disclosure relates generally to media content playback and interaction.

DESCRIPTION OF THE RELATED ART

Broadcasting can refer to distribution of media content (e.g., audio, video, etc.) to a dispersed audience via some mass communication medium. The mass communication medium may be a cable network, a data network, radio waves, and the like. Digital distribution can refer to delivery of media content without the use of physical media. Digital distribution has become popular due to advances in computer networking and communication technologies.

BRIEF SUMMARY OF THE DISCLOSURE

Various embodiments are directed to dynamically generating alternative versions (or shortened versions) of media content by using user preferences and temporal metadata associated with media content. Metadata can be used to tag objects and other aspects of a media content, e.g., a frame in a movie, a group of frames, scenes, portions of scenes, etc. A group of scenes can define one or more story "arcs." Based upon one or more user and/or filmmaker preferences, a media content can be dynamically redefined such that a user can consume the media content in, e.g., a shorter amount of time.

In accordance with one embodiment of the technology disclosed herein, a computer-implemented method comprises receiving, from a user, a desired temporal parameter associated with a media content. The method further comprises generating a short-form version of the media content comporting with the desired temporal parameter and preserving a pre-determined thematic aspect of the media content, the thematic aspect being associated with certain portions of the media content.

In accordance with another embodiment, a non-transitory computer readable medium has computer executable program code embodied thereon, the computer executable program code being configured to cause a processor to: receive a user-specified time limit during which the user desires to consume a media content, the user-specified time limit being less than an originally intended duration of the media content; and automatically generate an alternative version of the media content meeting the time limit and preserving a pre-determined thematic aspect of the media content, the thematic aspect being associated with certain portions of the media content.

In accordance with yet another embodiment, an apparatus comprises a processor and a memory unit operatively connection to the processor. The memory unit includes computer code configured to cause the processor to: retrieve a user-specified time limit during which the user desires to consume a media content, the user-specified time limit being less than an originally intended duration of the media content and the user-specified time limit being indicated by a user through a user interface hosted on a remote user device; and automatically generate an alternative version of the media content meeting the time limit and preserving a pre-determined thematic aspect associated with a narrative represented in the media content.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
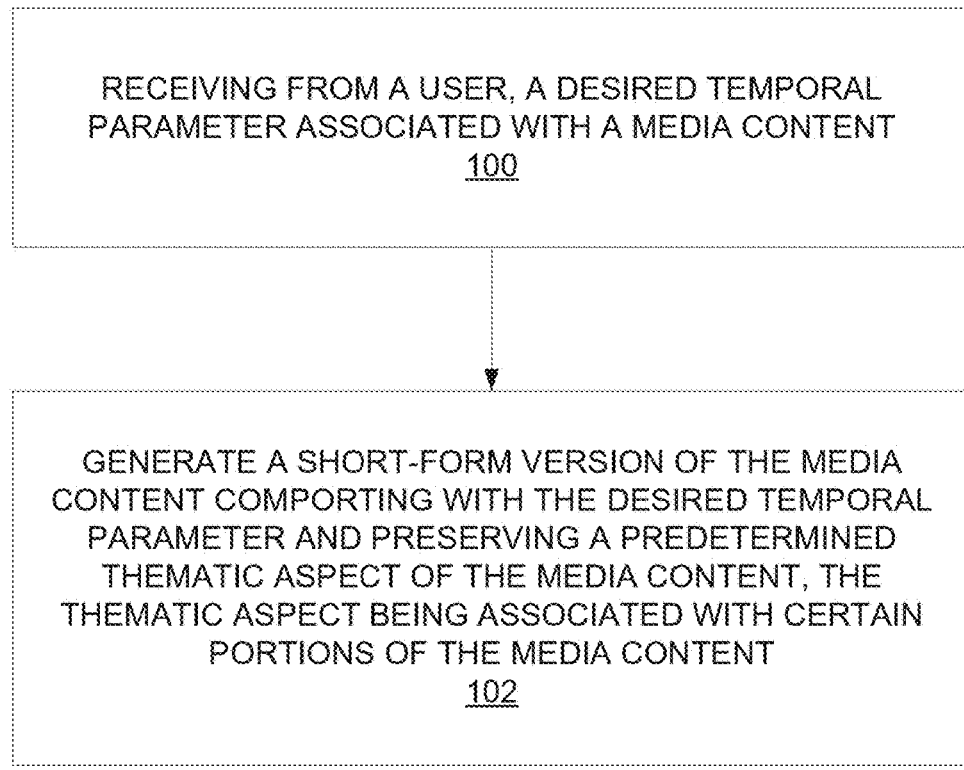
FIG. 1 is a flow chart illustrating example operations that can be performed to generate a short-form version of media content in accordance with various embodiments.

The figures are not exhaustive and do not limit the present disclosure to the precise form disclosed.

DETAILED DESCRIPTION

Traditional broadcasting, such as television broadcasting or radio broadcasting may be thought of as being "linear." That is, the audience has no control over what is being broadcast or when content can be consumed. Accordingly, a television program must be watched at a scheduled time and on a channel set by the television program provider, e.g., television broadcast network, prohibiting any type of interaction or alternative viewing mechanism(s). However, "non-linear" broadcasting technology, such as Video on Demand (VOD) technology, allows a consumer to select particular media content for viewing at a time of their choice. Viewing VOD media content can be provided for a fee or as part of a paid subscription, e.g., a cable subscription package from a cable provider.

Common to broadcasting media content, both linear and non-linear, and regardless of whether the media content is transmitted via cable, satellite, or in the form of on-line streaming media, etc., is the inability to tailor media content to users' needs/desires. However, the proliferation of mobile devices, content choices, user-generated content and short form content channels such as You Tuber®, Vine™, etc. have all contributed to the consumer trend of watching a higher volume of media content that is of increasingly shorter duration (commonly referred to as "short-form content"). Short-form content distribution channels are highly personalized to the media content consumer, and use recommendation systems that deliver short pieces of media content of interest to an individual consumer in an optimized manner.

"Vines" are an extreme manifestation of this trend with media content having a duration of only six seconds. Some statistics indicate that on mobile-delivered movie services, the average viewing time of media content such as a movie is less than 20 minutes and it has been noted that shorter form content generally performs better than longer duration content. Moreover, traditional content creators, especially film studios, are focused on producing long-form content (e.g. feature-length content between 90 and 200 minutes). Thus, a challenge exists in presenting such long-form content in a short-form format to satisfy the emerging demands of consumers, while at the same time preserving at least some of the intent and maintaining at least some of the integrity of, e.g., a story, theme(s) of content, etc.

For example, conventional systems and methods of providing short-form content may involve a person manually splicing together "highlights" of a sporting event or presenting one or more clips of a movie in the form of a movie preview. Still other conventional systems and methods may involve cutting one or more portions from media content, such as removing "offensive" scenes of a movie to provide a censored version of the movie. However, none of these conventional systems and methods are able to preserve, e.g., a film maker's intent, nor can they retain story "arcs" (i.e., the beginning, middle, and end of content(s) or thematic aspects presented therein).

Moreover, unsanctioned, alternate cuts of movies are available. Illegitimate "rips" and copies of media content are increasingly becoming available and accessible through illegitimate online methods, which are a near perfect substitution for legitimate versions of the long-form content. These illegitimate versions are often available for free which has decreased consumers' perception of value for legitimate digital versions of video content. Although there is trend towards delivering highly relevant and personalized content to consumers via algorithmic advertisements on video platforms or user generated mash-ups, media content such as video content has not yet been personalized in a unique manner based on the original, long-form version of content.

Accordingly, various embodiments described in the present disclosure provide systems and methods for modifying long-form content such that it may be presented as short-form content. A short-form version of long-form content can be delivered in an automated, dynamic matter that can maintain at least some of the intent of a content creator. Moreover, the short-form version of the long-form content can be tailored to meet the needs and/or desires of a user consuming the content using, e.g., data driven knowledge of the content structure, consumer data, and/or consumer preferences.

FIG. 1 illustrates example operations performed in accordance with various embodiments for generating a short-form version of media content from traditional long-form media content, such as a movie, documentary or other video. At operation 100, a desired temporal parameter associated with a media content is received from a user. For example, and as will be discussed in greater detail below, a user/consumer of media content may specify a time limit or duration within which the consumer wishes to have a short-form version of the media content presented to him or her. That is, a consumer may wish to view a shortened version of a feature-length film so that the consumer may still enjoy the film, albeit over a smaller time period (e.g., 15 minutes as opposed 2 hours). At operation 102, a short-form version of the media content comporting with the desired temporal parameter and preserving a predetermined thematic aspect of the media content is generated, the thematic aspect being associated with certain portions of the media content. Each frame or scene in a movie may be ranked or prioritized in importance or relevance to one or more themes, such as a story arc selected by a filmmaker (e.g., director or editor), action scenes, romance scenes, comedy scenes, a character's story, etc. Unlike conventional methods of generating short-form content from long-form content, various embodiments of the present disclosure are able to maintain, in the short-form version of the media content, a filmmaker's intent, narratives, or story line(s) present in the long-form version of the media content. Continuing with the above example, a 15-minute version of the media content (e.g., originally a 2-hour long film) is generated without sacrificing a thematic aspect or story line(s) of the film. Thus, a consumer may still appreciate a thematic aspect of a media content within a shorter time period.

Figure 2:
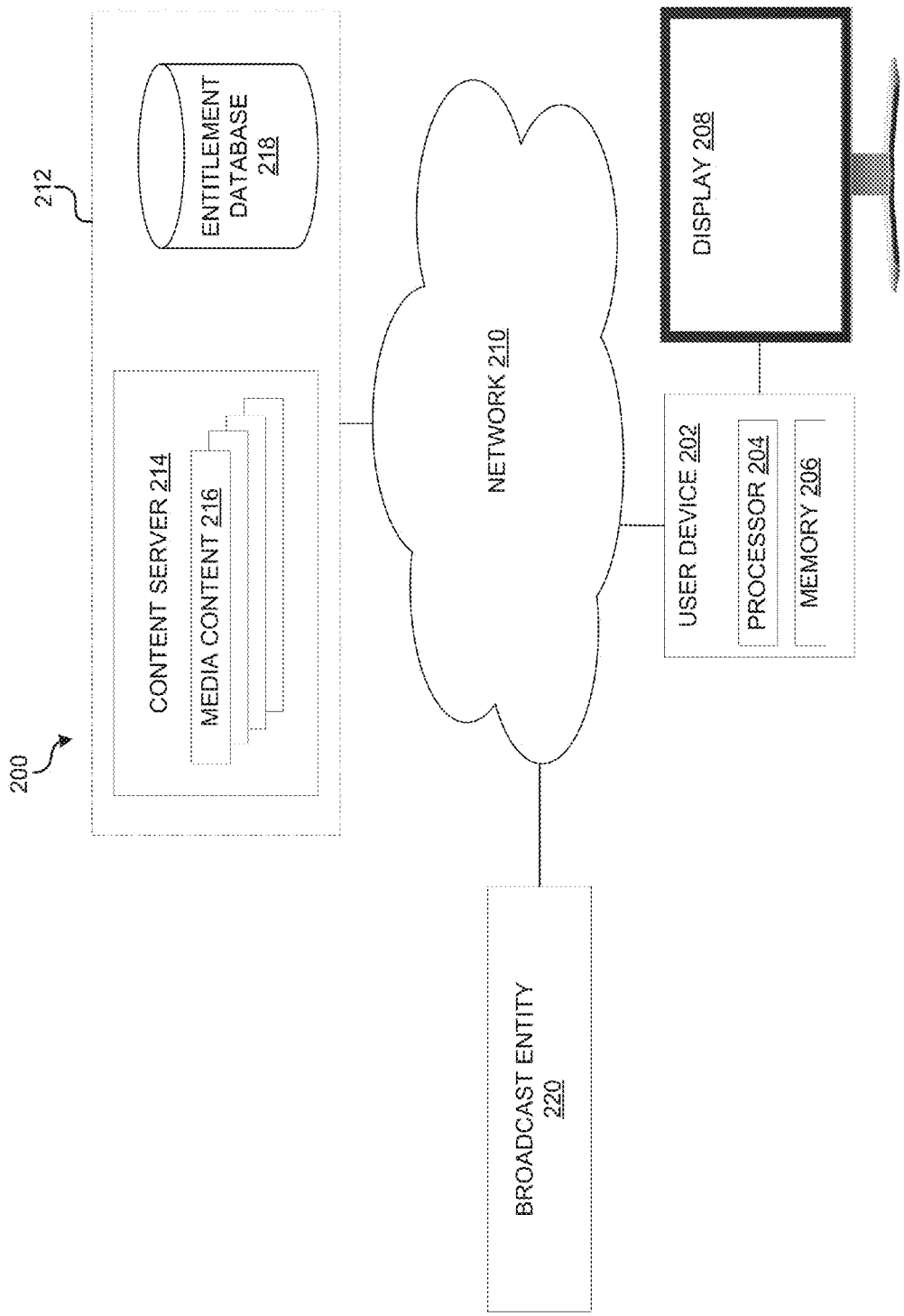
FIG. 2 illustrates an example environment in which various embodiments may be implemented.

FIG. 2 is a diagram illustrating an example environment in which various embodiments can be implemented. FIG. 2 illustrates a system 200 for generating and consuming short-form media content. As illustrated in FIG. 2, system 200 can include a user device 202. User device 202 may include a processor 204 and a memory unit 206, and can be configured to receive and/or store digital media content, media content (e.g., via a digital video stream), etc. for presentation on a display 208. User device 202 may be a DVR, a cable/satellite/internet protocol television (IPTV) set-top box, a gaming console, a tablet personal computer (PC), a smart phone, a laptop PC, augmented reality display headset, smart watch, etc. Display 208 may be a TV, monitor, or other presentation/media content consumption apparatus. It should be noted that in some embodiments, a separate display may be not be necessary. For example, the viewing of broadcast and alternative versions of media content can occur directly on user device 202, when user device 202 is, e.g., a smart phone or tablet PC.

System 200 may further include a content provider 212, which may be a broadcast entity, such as a television broadcast network entity (e.g., ABC), a cable provider (e.g., COMCAST®), or any other digital media content distributor, such as Amazon®, iTunes®, Netflix® or other third-party distributor. Content provider 212 may include a content server 214 on which digital media content 216 can be stored, along with any required entitlements which can be maintained in entitlement database 218. It should be noted that in certain scenarios where content provider 212 is, e.g., a digital media content distributor, such as Amazon®, iTunes®, etc., user device 202 may receive media content from a separate broadcast entity 220, such as a cable provider. In accordance with another embodiment, content provider 212 and digital media content distributor may be the same entity. In accordance with yet another embodiment, content provider 212 may be a content creator, e.g., production studio, that also distributes its own content to consumers.

It should be noted that one or more licenses or temporary licenses can be created, utilized, and/or transferred to the appropriate entities in accordance with various embodiments. Such licenses can be configured to account for varying levels of access and/or distribution, time limits, usage limits, as well as partitioned if need be. For example, broadcast entity 220 may obtain, e.g., a temporary license to a short-form version of some media content, from content provider 212. In this way, a viewer is allowed to request and receive the short-form version of that media content for viewing via an interface (e.g., video on demand) of broadcast entity 220.

Network 210 may be any communications network such as a cellular or data network, a satellite network, an intranet, an extranet, a virtual private network (VPN), a local area network (LAN), a wireless LAN (WLAN), a wide area network (WAN), a personal area network (PAN), a portion of the Internet, a portion of the Public Switched Telephone Network (PSTN), or any combination thereof. Accordingly, network 210 may employ various communication media, such as a coaxial cable, fiber optic cable system, Ethernet, radio waves, etc.

The systems and methods described herein can use the temporal metadata 302 to create "micro-stories" 308 to meet a consumer's time criteria, as shown in FIGS. 3, 4, 5A, and 5B. Such micro-stories 308 can be created on-the-fly, and served from, for example, a central or remote (media) server, such as content server 214.

Computer analysis of a long-form movie 216 (FIG. 3), for example, can generate metadata 302 (FIG. 3) describing objects and actions based on the temporal nature of the movie at a frame level, camera shot level, cut level, or scene level. That is, temporal data 302 can be associated with various granular (fine or coarse) portions or sections of media content. In addition, filmmakers can generate metadata that describes a scene or portion of a scene, an associated story arc(s), and its significance to other metadata in order to provide a mechanism for creating a thematic thread(s) within the storyline or narrative of a media content. Examples of metadata include, but are not limited to, information identifying locations (fictional or filming locations), characters, actions, music, objects associated with a scene, a short scene, or a cut or individual frame identified by a timecode. The metadata 302 can co-exist with or be a part of the media content itself. Given some long-form version of media content 216, temporal and/or story-based metadata 302 can be generated and used to tag corresponding portions or sections of the movie, allowing key scenes or portions of scenes that contribute to a given story arc can be identified.

Figure 3:
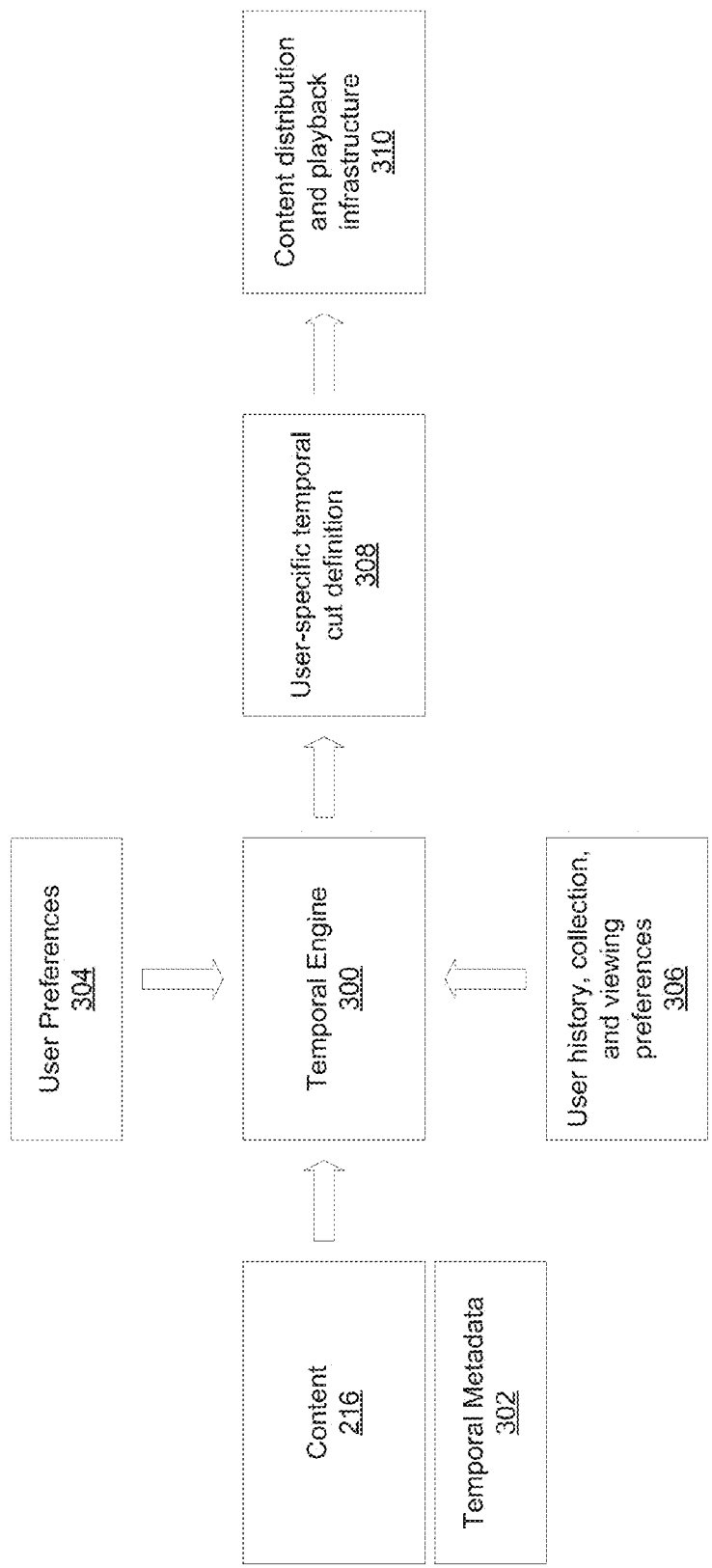
FIG. 3 is a schematic representation of the elements and operational flow involved in generating a short-form version of media content in accordance with various embodiments.

FIG. 3 is a schematic representation of elements and associated process flow that may be used to create the aforementioned short-form version of media content in accordance with various embodiments. One element of FIG. 3 is a temporal engine 300 for receiving user preferences 304, 306, analyzing metadata-tagged (long-form) media content 216, and outputting a dynamically generated short-form version of the media content 308. In particular, temporal engine 300 may retrieve media content 216 that is tagged with temporal metadata 302. Each frame in a video may have objects (including characters), actions, and other aspects of the frame that are tagged with metadata. The metadata-tagged media content 216 may be retrieved from, e.g., content server 214 of content provider 212 of FIG. 2. That is, temporal metadata 302 may be associated with media content prior to storage as media content 216. It should be noted that media content 216 (whether metadata-tagged or not) can be stored in content server 214. Media content 216 can be broadcast, distributed, etc. in its long-form version tagged with metadata 302, i.e., the temporal metadata can be ignored until a consumer requests a short-form version of media content 216, at which time the metadata can be analyzed by temporal engine 300.

Temporal engine 300 may also analyze user preferences 304 received from a user who requested a short-form version of media content 216. As described above, user preferences 304 may include the desired time limit or duration criteria specified by the consumer (see FIG. 5A). For example, a time constraint 304, e.g., a total desired duration over which the user wishes to view the short-form version of the media content. Scenes, portions of scenes, etc. can be prioritized by the temporal engine 300 for inclusion or deletion from the short-form version of the media content derived from the long-form version of the media content 216 based on importance in terms of the story arc(s) present within the long-form version of the media content 216 (see FIG. 4). Thus, a user may only have 15 minutes of time to watch media content, but the desired media content 216 the user wishes to consume is a feature-length media content. Various embodiments, based on the generated metadata, can dynamically create a 15-minute version 308 of the feature-length media content that includes a beginning, middle, and end, thereby preserving at least one story arc.

Figure 5A:
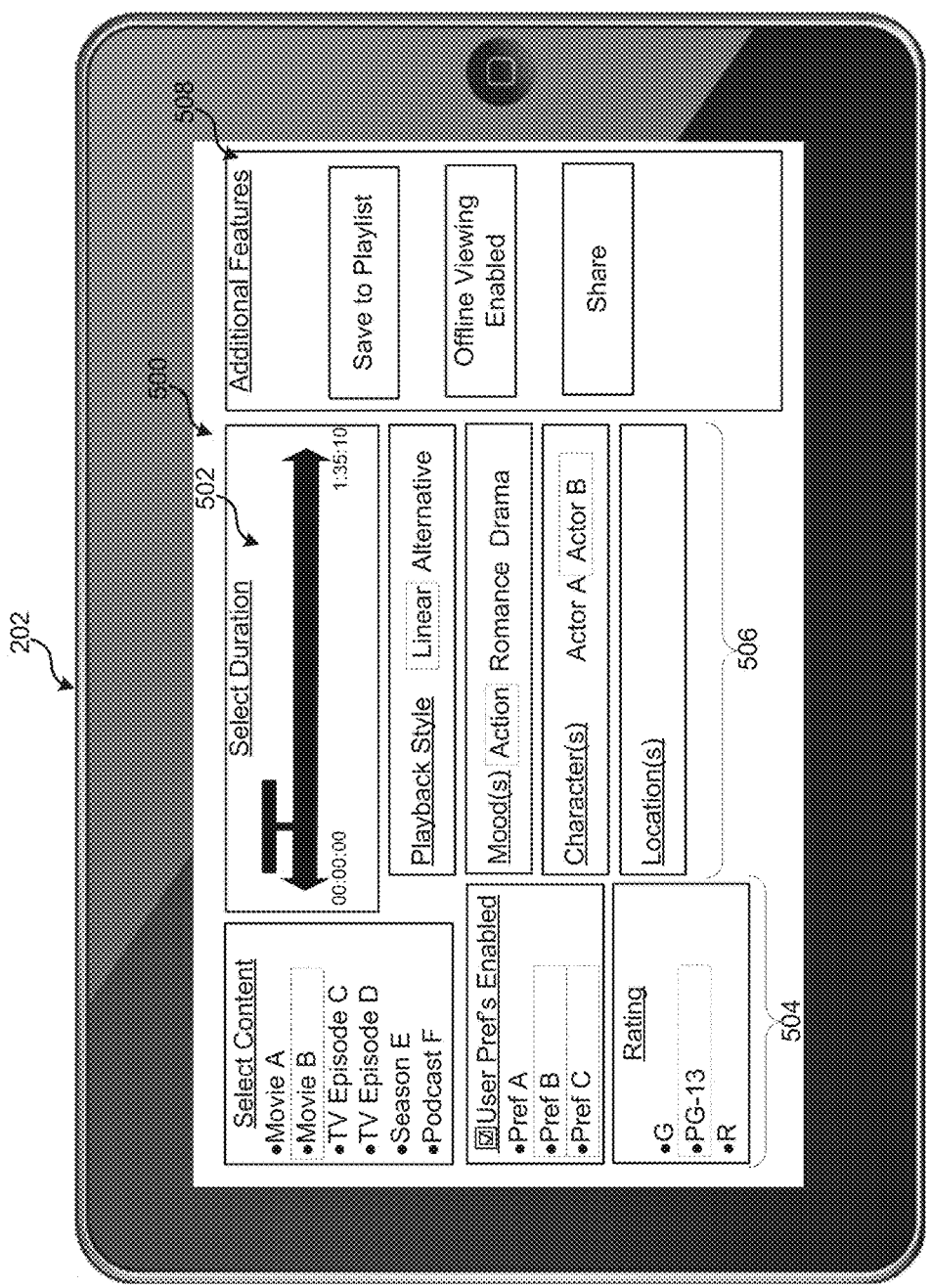
FIG. 5A is an example user interface presenting options upon which the generation of a short-form version of media content is based in accordance with various embodiments.

User preferences 304 may further include indications of particular content that the consumer wishes to have included within or excluded from the short-form version of the media content (see FIG. 5A). This may be an indication of a particular actor(s) that the consumer wishes to focus on and see more of (versus other actors or character(s)), and/or a particular theme/plot or sub-theme/sub-plot that the consumer is interested in seeing. Alternatively, the consumer may wish to eliminate all violent or scary scenes. Such user preferences 304 may be specified by the consumer and maintained in, e.g., a user profile, that is also stored by content provider 212 and maintained with entitlement database 218 or a separate data repository, maintained in memory 206 of user device 202 and accessed by content provider 212, etc.

Further still, temporal engine 300 may retrieve a consumer's user history, media content collection, and/or other viewing preferences 306. That is, the consumer may have shown a strong affinity 306 through past media content consumption to a particular actor or actress, a character, story elements or type of content (analytics), also resulting in the inclusion or exclusion of one or more scenes or portions thereof. Such information may be obtained via analytics applied to data collected based on the consumer's previous viewing behaviors or preferences and/or current or past media content collection. User preferences 304 may be directly received from a user, while user history and viewing preferences 306 may be analyzed by a computer.

Based on one or more of the above inputs to temporal engine 300, temporal engine 300 may output a user-specific temporal cut definition 308, i.e., an aforementioned playlist of the relevant scenes or portions of media content that meet the user's time criteria along with any user preferences, historical or media collection data. In other words, a set of scenes or media content portions can be played in succession or other appropriate order to deliver a customized, short-form version of the media content. The resulting user-specific temporal cut definition may then be utilized by a distribution and playback infrastructure 310 (e.g., system 200 of FIG. 2) to deliver the short-form version of the media content to the requesting consumer. User-specific temporal cut definition 308 can be a set of data that defines the cut for that specific user and input criteria etc; it may not be the cut or video file itself. The definition 308 will effectively comprise of a set of content start and end points that when played continuously represent the user specific cut. A definition can span multiple pieces of content.

Figure 4:
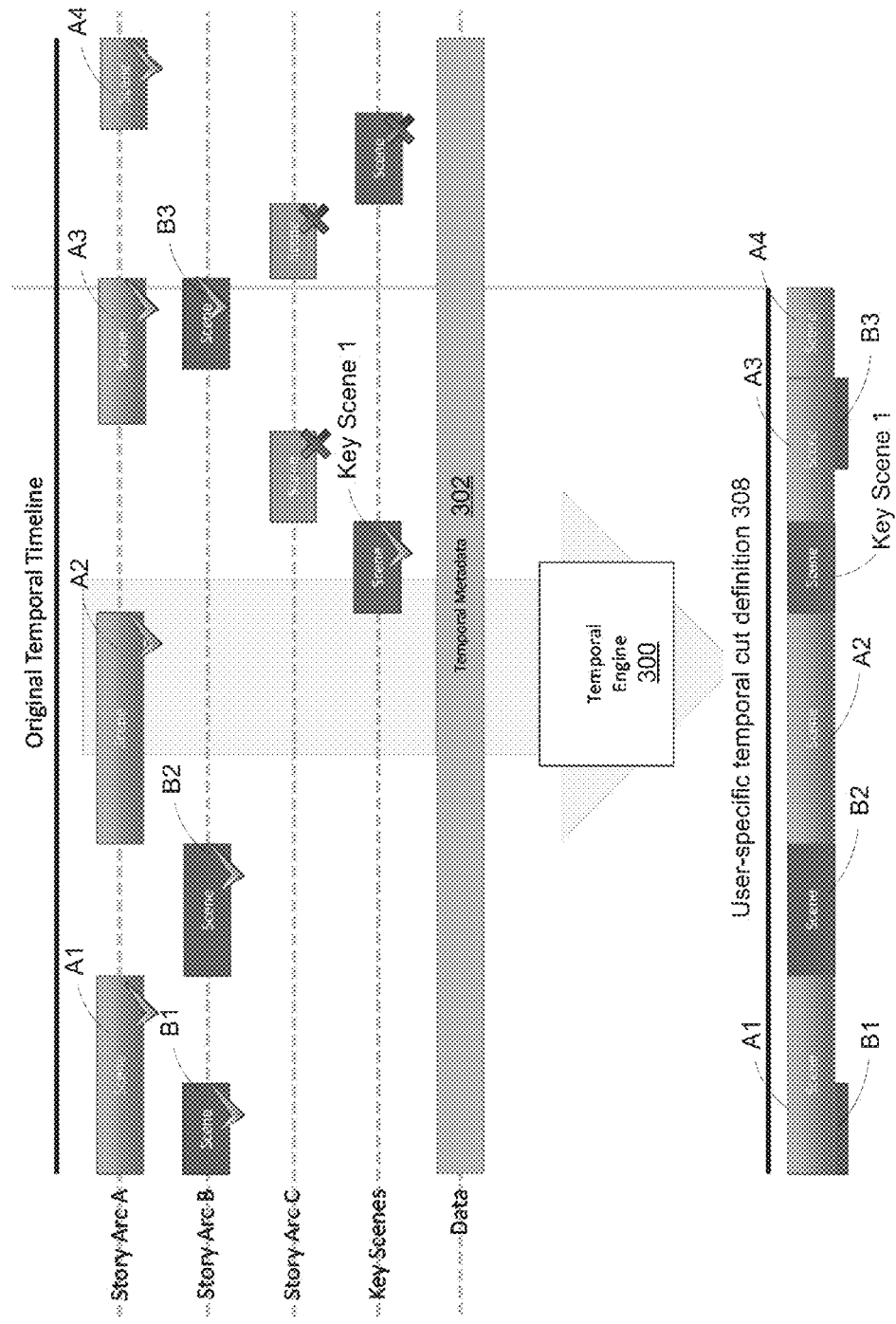
FIG. 4 illustrates an example of metadata and scene analysis used to generate a short-form version of media content in accordance with various embodiments.

FIG. 4 illustrates an example of short-form version media content creation in accordance with various embodiments. In this example, scenes from story arc C have been removed (from an original long-form temporal timeline) to reduce the duration of a movie. The removal of such scenes allows the consumer to experience the movie in a shorter form while preserving "key" story arcs A and B. In addition, other key scenes may be selected or eliminated based on the target duration or other preferences either expressed explicitly or derived through analytics, as described previously. In particular, story arc scenes A1, A2, A3, and A4 have been preserved along with story arc scenes B1, B2, B3, and key scene 1 in user-specific temporal cut definition 308 to appear in accordance with a specified time duration that is shorter than the original temporal timeline.

As discussed above, temporal engine 300 constructs a definition of the derived content by prioritizing individual scenes, cuts or frames based on the temporal metadata 302 and user preferences 304 and/or user history 306. Temporal engine 300 iterates through this process until it finds an optimal cut for the derived media content, i.e., one that preserves one or more desired story lines (as set forth by the filmmaker or in accordance with the consumer's preferences) and meets the specified time criteria. The output of temporal engine 300, as also discussed above, is a definition of the derived cut (short-form version) in terms of the sub-sections of the original media content, which can then be distributed to the consumer.

In accordance with another embodiment, and as also described previously, temporal metadata can span multiple, disparate pieces of media content to create custom "mash-ups." For example, a consumer can generate short-form media content by pulling together certain battle scenes having a common thematic element(s) in a series of action movies, or all the scenes or scene portions that include a given character across a particular movie franchise.

It should be noted that while post analysis can be done on existing long-form media content to generate temporal metadata suitable for use in accordance with various embodiments, temporal metadata generation may also occur during pre-production, production, and/or post-production of media content. Understanding this method, and the variability of consumption, filmmakers may choose to shoot and edit long-form media content in such a manner as to make alternate, dynamic cuts easier to generate.

For example, a filmmaker may produce "specially filmed" scenes that can be assembled linearly, e.g., as in an original, long-form version of a film, yet can be rearranged/reassembled to reveal another story line or alternate ending, etc. When viewed in the long-form version, a viewer will not necessarily notice such scenes as being special. While in a reassembled, short-form version, some story line aspect that was previously hidden, can now be revealed. In this way, various embodiments can be used by a filmmaker to expand his/her creative palette.

Figure 5B:
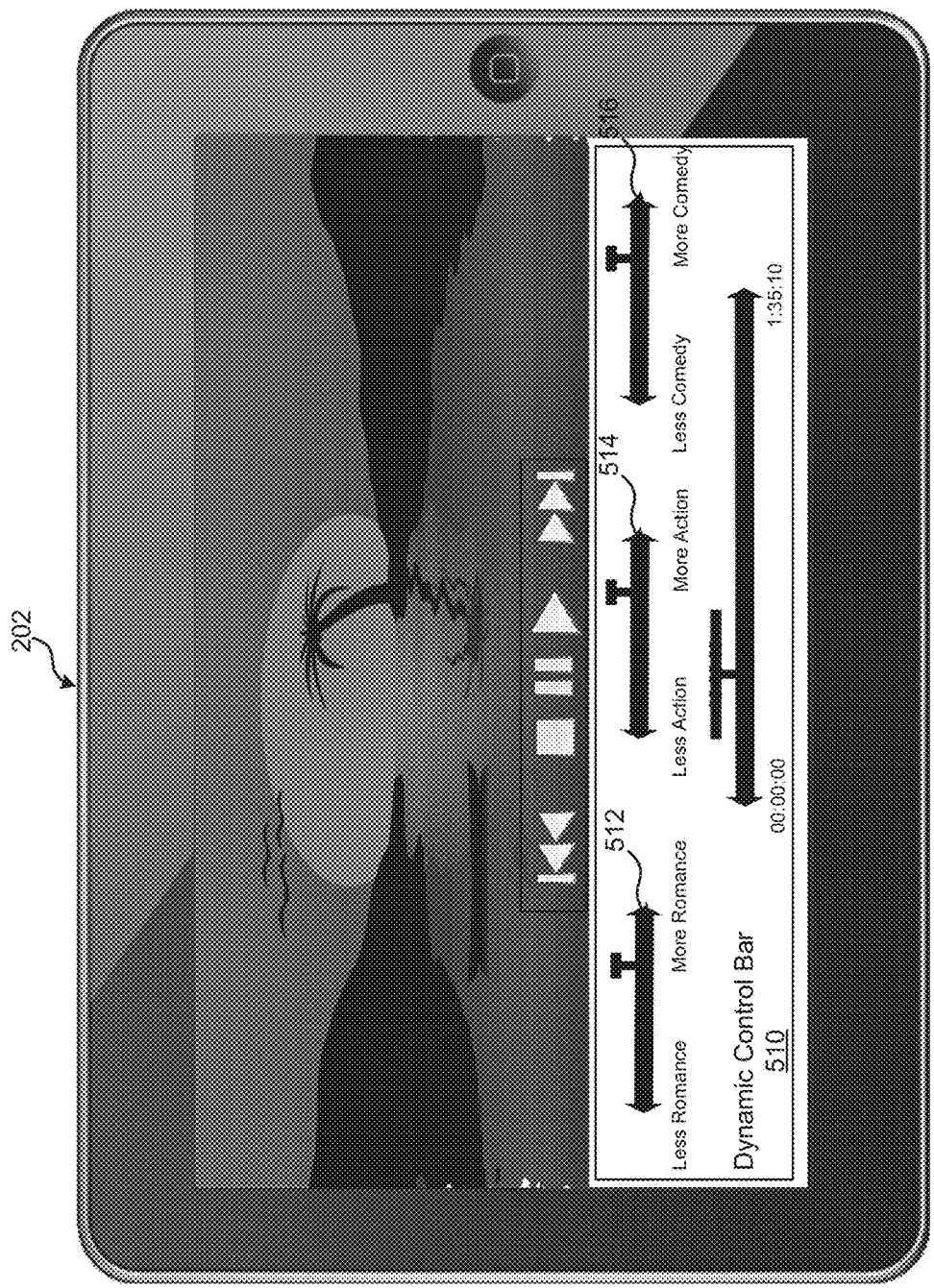
FIG. 5B is an example user interface through which dynamic alterations to a generated short-form version of media content can be achieved in accordance with various embodiments.

FIGS. 5A and 5B illustrate an example short-form specification user interface (UI) 500 and a dynamic control bar UI 510, respectively. Short-form specification UI 500 can be part of a stand-alone media player application running on a user device (e.g., user device 202 of FIG. 2), an online-accessible UI, etc. Short-form specification UI 500 may have a plurality of different menu options that allow the consumer to specify a desired time duration via, e.g., a sliding time duration control bar 502. Moreover, short-form specification UI 500 may have a content selection and user preferences menu(s) 504 from which a consumer may choose a particular media content from which a short-form version is generated, user preferences, rating, etc. Still other options may include menu options through which a consumer may specify a content-specific preferences 506, e.g., playback style, such as a linear playback (successive scene playback) or alternative (e.g., non-chronological) playback, a desired mood preference, a desired character(s) on which to focus the short-form version of the media content, as well as locations, e.g., fictional locations in a story or filming locations. Additional options 508 may also include a save to playlist option, the ability to view a short-form version of the media content offline, or the ability to share the short-form version of the media content. That is, the systems and methods described herein can allow a consumer to save a particular short-form version of media content (see FIG. 5A), which may be replayed by the consumer and/or distributed to another consumer that may have the requisite entitlement to view the long-form version of the same media content. This can be useful when, e.g., a consumer will not have a data connection to the content server 214. For example, if a user is boarding a plane, the user will have the option to create and download a short-form version of the media content for offline consumption during the flight. Further still, a particular profile (or playlist) of in-and-out points can be saved and redistributed (see FIG. 4), which allows for replaying of the short-form version of the media content while not requiring the creation of an actual separate instance of the media content.

Dynamic control bar UI 510 in FIG. 5B can be utilized by a consumer to alter, in real-time, the length of the playback of a short-form version of media content currently being presented. As previously discussed, a consumer may choose to further shorten (reduce the number of frames or scenes) or alternatively, lengthen (add more frames or scenes) a desired time duration. For example, the consumer may have originally specified a time duration of 10 minutes via the duration control bar 502 of short-form specification UI 500. However, during playback of the short-form version of the media content, the consumer may wish to lengthen the specified time duration to 20 minutes. Moreover, the consumer may wish to change the focus of the short-form version of the media content from, e.g., less action to more action (bar 512), less romance to more romance (bar 514), less comedy to more comedy (bar 516), etc. Accordingly, temporal engine 300 of FIG. 3 can re-analyze the metadata-tagged media content to distribute a new user-specific temporal definition in accordance with the altered specifics to comport with the consumer's needs/desires.

Conventional systems and methods of creating short-form media content rely on manual editing. In contrast, various embodiments provide a sanctioned/legitimate, and algorithmic/dynamically automated approach to produce derived content at scale that is highly personalized. Personalization and relevance drive value for consumers. Although data analytics has been used in the past to create algorithms for recommending media content to the consumer, it has not been utilized to drive any dynamic rearrangement/temporal change of the media content.

It should be noted that although various embodiments presented herein have been described in the context of video/visual-based media content, other embodiments can be adapted for use in other contexts, such as radio content, podcasts, games, audio books, and other such content. Moreover, although embodiments have been described in the context of specifying scenes or portions thereof, various embodiments contemplate partitioning media content based on different units in addition to or as an alternative to scenes/scene portions. Moreover, as utilized herein, the term scene may refer to a traditional scene or merely one or more aspects that make up a traditional scene. For example, a temporal cut may remove a certain amount of "lead-in" to a traditional scene, leaving only a relevant/desired portion of the scene to be included in a generated short-form version of media content. Further still, it should be understood that any resulting short-form version of media content can be played back in a "back-to-back" seamless manner such that there are no cinematic breaks that can be detected by the consumer.

Figure 6:
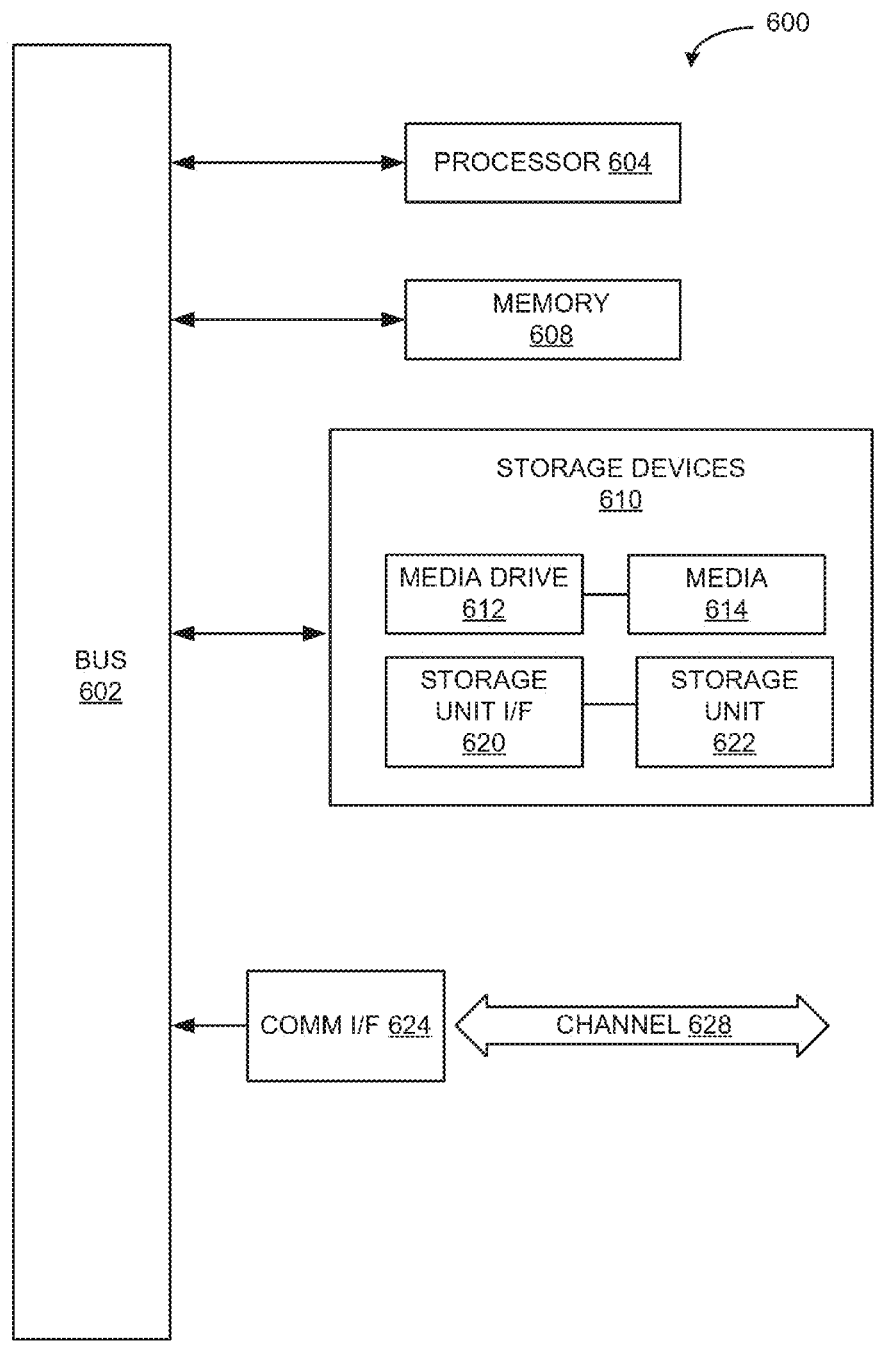
FIG. 6 is an example computing component that may be used to implement various features of embodiments described in the present disclosure.

FIG. 6 illustrates an example computing component that may be used to implement various features of the system and methods disclosed herein, such as the aforementioned features and functionality of temporal engine 300 of FIG. 3, short-form specification UI 500 of FIG. 5A, and/or dynamic control bar UI 510 of FIG. 5B.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components or components of the application are implemented in whole or in part using software, in one embodiment, these software elements can be implemented to operate with a computing or processing component capable of carrying out the functionality described with respect thereto. One such example computing component is shown in FIG. 6. Various embodiments are described in terms of this example-computing component 600. After reading this description, it will become apparent to a person skilled in the relevant art how to implement the application using other computing components or architectures.

Referring now to FIG. 6, computing component 600 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 600 might also represent computing capabilities embedded within or otherwise available to a given device. For example, a computing component might be found in other electronic devices such as, for example navigation systems, portable computing devices, and other electronic devices that might include some form of processing capability.

Computing component 600 might include, for example, one or more processors, controllers, control components, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing component 600 or to communicate externally.

Computing component 600 might also include one or more memory components, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing component 600 might likewise include a read only memory ("ROM") or other static storage device coupled to bus 602 for storing static information and instructions for processor 604.

The computing component 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 614 might include, for example, a hard disk, an integrated circuit assembly, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing component 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory component) and memory slot, a PCMCIA slot and card, and other fixed or removable storage units 622 and interfaces 620 that allow software and data to be transferred from the storage unit 622 to computing component 600.

Computing component 600 might also include a communications interface 624. Communications interface 624 might be used to allow software and data to be transferred between computing component 600 and external devices. Examples of communications interface 624 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 600 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
   receiving at a temporal engine, from a user, a desired temporal parameter associated with a media content tagged with metadata;
   analyzing by the temporal engine, the metadata to generate a short-form version of the media content comporting with the desired temporal parameter and preserving a pre-determined thematic aspect of the media content, the thematic aspect being associated with certain portions of the media content, the analyzing of the metadata comprising performing computerized data analytics on the metadata by the temporal engine in an iterative prioritization process to define the short-form version of the media content; and
   receiving at the temporal engine, an additional desired temporal parameter associated with the media content, and altering a total length of the generated short-form version of the media content during consumption thereof by generating another short-form version of the media content based on re-analyzing the metadata to preserve the pre-determined thematic aspect to comport with the additional desired temporal parameter;
   wherein the metadata is indicative of start and end points of at least one of scenes and scene portions defining two or more story arcs of the media content, wherein generating the short-form version of the media content comprises including and excluding at least one of the scenes and scene portions to provide a temporal cut definition of the short-form version of the media content preserving a first of the one or more story arcs without preserving a second one of the one or more story arcs based on user preference.

2. The computer-implemented method of claim 1, wherein the desired temporal parameter comprises a first time duration that is shorter than a second time duration associated with a long-form version of the media content.

3. The computer-implemented method of claim 2, wherein the additional desired temporal parameter associated with the media content comprises a numerical time duration that is longer than the first time duration and shorter than the second time duration.

4. The computer-implemented method of claim 1, wherein the generation of the short-form version of the media content comprises generating a playlist of the start and end points of the at least one of the scenes and scene portions comprising the temporal cut definition of the short-form version of the media content.

5. The computer-implemented method of claim 1, further comprising determining at least one of user preferences relevant to one or more aspects of the media content and user analytics data, wherein the user preferences comprise media content components of interest to a user requesting the short-form version of the media content.

6. The computer-implemented method of claim 5, further comprising receiving at least one of an additional user preference and additional user analytics data during consumption of the short-form version of the media content, and altering the generated short-form version of the media content during consumption thereof to comport with the at least one of the additional user preference and the additional user analytics data.

7. The computer-implemented method of claim 1, wherein at least one or more aspects of the predetermined thematic aspect of the media content span the media content and additional media content associated with the media content.

8. A computer-implemented method, comprising:
receiving at a temporal engine, from a user, a desired temporal parameter associated with a media content tagged with metadata;
analyzing by the temporal engine, the metadata to generate a short-form version of the media content comporting with the desired temporal parameter and preserving a pre-determined thematic aspect of the media content, the thematic aspect being associated with certain portions of the media content, the analyzing of the metadata comprising performing computerized data analytics on the metadata by the temporal engine in an iterative prioritization process to define the short-form version of the media content; and
receiving at the temporal engine, an additional desired temporal parameter associated with the media content, and altering a total length of the generated short-form version of the media content during consumption thereof by generating another short-form version of the media content based on re-analyzing the metadata to preserve the pre-determined thematic aspect to comport with the additional desired temporal parameter;
wherein at least one of the short-form version of the media content comporting with the desired temporal parameter and the other short-form version of the media content comporting with the additional desired temporal parameter comprises a rearrangement of the certain portions of the media content revealing a previously un-revealed thematic aspect of the media content.

9. A non-transitory computer readable medium having computer executable program code embodied thereon, the computer executable program code configured to cause a processor to:
receive a user-specified time limit during which the user desires to consume a media content, the user-specified time limit being less than an originally intended duration of the media content, the media content being tagged with metadata;
analyze the metadata to automatically generate an alternative version of the media content meeting the time limit and preserving a pre-determined thematic aspect of the media content, the thematic aspect being associated with certain portions of the media content, wherein the computer executable program code configured to cause the processor to analyze the metadata comprises computer executable program code to perform data analytics on the metadata in an iterative prioritization process to define the alternative version of the media content; and
receive an additional user-specified time limit associated with the media content, and alter a total length of the automatically generated alternative version of the media content during consumption thereof by generating another alternative version of the media content based on re-analyzing the metadata to preserve the pre-determined thematic aspect to comport with the additional user-specified time limit;
wherein the metadata is indicative of start and end points of at least one of scenes and scene portions defining at least one narrative of the media content; and
wherein the media content is at least one of produced and edited such that upon the automatic generation of the alternative version of the media content, the at least one narrative remains hidden in a long-form version of the media content, yet appears in the alternative version of the media content.

10. The non-transitory computer readable medium of claim 9, wherein the automatic generation of the media content comprises including and excluding at least one of the scenes and scene portions in a rearranged order to provide a temporal cut definition of the alternative version of the media content.

11. The non-transitory computer readable medium of claim 10, wherein the computer executable program code configured to cause the processor to automatically generate the alternative version of the media content comprises computer code configured to further cause the processor to generate a playlist of the start and end points of the at least one of the scenes and scene portions comprising the temporal cut definition of the alternative version of the media content.

12. The non-transitory computer readable medium of claim 9, wherein the computer executable program code further causes the processor to receive at least one of user preferences and user analytics data during consumption of the alternative version of the media content, and alter the automatically generated alternative version of the media content during consumption thereof to comport with the at least one of the user preferences and the user analytics data.

13. The non-transitory computer readable medium of claim 9, wherein the second user-specified time limit is a numerical time limit longer in duration than the first user-specified time limit and shorter than the originally intended duration of the media content.

14. An apparatus, comprising:
a processor; and
a memory unit operatively connected to the processor, the memory unit including computer code configured to cause the processor:
to retrieve a user-specified time limit during which the user desires to consume a media content, the user-specified time limit being less than an originally intended duration of the media content and the user-specified time limit being indicated by the user through a user interface hosted on a remote user device, the media content being tagged with metadata;
analyze the metadata to automatically generate an alternative version of the media content meeting the user-specified time limit and preserving a pre-determined thematic aspect associated with a narrative represented in the media content, wherein the computer code configured to cause the processor to analyze the metadata comprises computer code to perform data analytics on the metadata in an iterative prioritization process to define the alternative version of the media content; and
receive an additional user-specified time limit, and alter a total length of the automatically generated alternative version of the media content during consumption thereof by generating another alternative version of the media content based on re-analyzing the metadata to preserve the pre-determined thematic aspect to comport with the additional user-specified time limit, the media content comprising a media content file previously tagged with metadata;
wherein the metadata is indicative of start and end points of at least one of scenes and scene portions defining two or more story arcs of the media content, wherein generating the alternative version of the media content comprises including and excluding at least one of the scenes and scene portions to provide a temporal cut definition of the alternative version of the media content preserving a first of the one or more story arcs without preserving a second one of the one or more story arcs based on user preference.

15. The apparatus of claim 14, wherein the user interface comprises a plurality of options for optimizing the alternative version of the media content including at least one of an option for dynamically updating the user-specified time limit to the additional user-specified time limit, an option for specifying user preferences associated with one or more components of the narrative, an option for generating an offline-viewable instance of the alternative version of the media content, an option to save a playlist representative of the automatically generated alternative version of the media content, and an option to share the automatically generated alternative version of the media content with another user.

16. The apparatus of claim 14, wherein the media content is tagged with the metadata, either prior to production or after production of the media content, the metadata being indicative of start and end points of at least one of scenes and scene portions defining the pre-determined thematic aspect associated with the narrative represented in the media content.

17. The apparatus of claim 14, wherein the additional user-specified time limit is a numerical time limit longer than the user-specified time limit and shorter than the originally intended duration of the media content.

18. The apparatus of claim 14, wherein the memory unit including computer code configured to cause the processor to automatically generate the alternative version of the media content comprises computer code configured to cause the processor to generate a playlist of start and end points of at least one of scenes and scene portions, the at least one of the scenes and scene portions being rearranged in order, comprising a temporal cut definition of the alternative version of the media content.

* * * * *